United States Patent Office 3,745,205
Patented July 10, 1973

3,745,205
EXTRACTION OF URANIUM FROM AN AQUEOUS SOLUTION
Donald F. Peppard, Oak Park, and George W. Mason, Clarendon Hills, Ill., Allen F. Bollmeier, Jr., Terre Haute, Ind., and Sonia Lewey, Joliet, Ill., assignors to the United States of America as represented by the United States Atomic Energy Commission
No Drawing. Filed Feb. 17, 1972, Ser. No. 227,114
Int. Cl. C01g 43/02
U.S. Cl. 423—10                                       6 Claims

ABSTRACT OF THE DISCLOSURE

Uranium values are separated from the lanthanides, actinides, and yttrium values in a +3 valence state and from thorium values by dissolving the values in hydrochloric acid to prepare a feed solution, and contacting the feed solution with an organic extractant of bis(2,6-dimethyl-4-heptyl) phosphoric acid in an organic diluent whereby the uranium values are selectively extracted and the other values remain in the feed solution.

CONTRACTUAL ORIGIN OF THE INVENTION

The invention described herein was made in the course of, or under, a contract with the United States Atomic Energy Commission.

BACKGROUND OF THE INVENTION

This invention relates to a method for separating uranium values from thorium, yttrium, and the lanthanides and actinides.

Important to the future production of electrical power is an adequate supply of fissionable material with which to fuel nuclear power reactors. At present, these reactors are fueled with fissionable uranium-235 which is in limited supply. One approach now being taken to overcome this shortage is the development of "breeder" power reactors, that is, reactors which produce more new fissionable material than fissionable material consumed in sustaining the chain reaction. Although the conversion of uranium-238 into plutonium-239 is one method of breeding more fissionable material, thorium can also be used as a fertile material in breeder nuclear reactors to produce fissionable material by the following reaction:

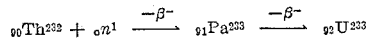

Thus thorium, which is in abundant supply, can be converted into a usable nuclear fuel and increase the world's total nuclear power resources.

However, one problem with the use of thorium as a fertile material is the difficulty of separating uranium from thorium so that the fissionable $U^{233}$ can be processed for use as fuel in other nuclear power reactors.

There are a number of methods available for the separation of uranium from thorium and from the other fission products which would be present in an irradiated fuel element. Most of these methods have deficiencies which make them undesirable or impracticable for use in the reprocessing of fuel elements.

Separation methods which use an acid medium are well known. For example, a nitrate solution containing very small amounts of uranium and thorium per liter may be precipitated at a pH of 3 for thorium and 3.8 for uranium, to give hydroxides of gelatinous consistency. Separation is possible but requires a great number of stages of purification. In the presence of sulfuric acid, hydrated thorium sulfate has a solubility of from 10 to 12 grams per liter; however, the sulfate swells when becoming hydrated which makes it difficult to filtrate, and it cannot be washed because of its solubility.

Hydrofluoric acid can also be used, since thorium fluoride is insoluble in an acid medium; however, precipitation is difficult due to the existence of double fluorides which increase solubility, and the precipitate tends to form a solid mass which makes it difficult to wash. In addition, hydrofluoric acid is expensive and very corrosive.

In still another method, a soluble sulfate is added to thorium and uranium values dissolved in nitric acid. The solution is first warmed and then neutralized to a pH of between 2 and 5, whereupon the thorium precipitates while the uranium remains in solution. This method is limited to situations where the uranium and thorium are present in relatively large amounts such as in high-grade ores, or where the ore has been concentrated by treatment of low-grade ores, and is not usable in the reprocessing of nuclear reactor fuels where the concentrations of values are very small.

SUMMARY OF THE INVENTION

We have developed a method of separating uranium values from thorium, yttrium, and the lanthanides and actinides which eliminates many of the problems hereinbefore enumerated. By this method, the uranium, thorium, yttrium, and actinide and lanthanide values are dissolved in hydrochloric acid to form a feed solution which is contacted with an extractant solution of bis(2,6-dimethyl-4-heptyl) phosphoric acid [hereinafter referred to as HD(DIBM)P] in an organic diluent whereby the uranium values are taken up by the organic solution and the other values remain in the feed solution, separating the extractant solution from the feed solution and stripping the uranium values from the extractant solution.

This method is operable not only for small concentrations of uranium, thorium and other values, but also for higher concentrations such as might be present in a high-grade ore, although in the presence of large concentrations of values some dilution of the feed solution may be necessary, as will be explained in greater detail hereinafter.

It is therefore one object of this invention ot provide a method of separating uranium values from thorium values.

It is another object of this invention to provide a method for separating uranium values from thorium, yttrium, lanthanide and actinide values.

Finally, it is the object of this invention to provide an effective method for separating uranium values from thorium, yttrium, lanthanide and actinide values where said values are present in a hydrochloric acid solution.

DESCRIPTION OF THE PREFERRED EMBODIMENT

These and other objects of the invention may be met by dissolving the uranium, thorium, yttrium, lanthanide and actinide values in hydrochloric acid, adjusting the concentration until it is from 0.1 to 1.0 M in hydrochloric acid and up to 0.25 M in uranium values, thus forming a feed solution, contacting the feed solution with an extractant solution of bis(2,6-dimethyl-4-heptyl)phosphoric acid in an organic diluent such as n-heptane or benzene whereby the uranium values are extracted into the extractant solution and the other values remain in the feed solution, separating the extractant solution and the feed solution and contacting the extractant solution with an aqueous solution of 6–9 M hydrochloric acid as a back-extractant, whereby the uranium values are back-extracted from the extractant solution.

The process of this invention is useful for the separation of uranium values from thorium, yttrium, the trivalent lanthanide rare earths, the trivalent and tetravalent actinides and from many other metals such as calcium, sodium and magnesium not usually found associated with uranium and thorium.

The feed solution is prepared by dissolving the uranium and other values from which the uranium is to be separated, in hydrochloric acid. Dissolution may be accomplished by known methods such as heating or using a high acid concentration. After dissolution, the solution is adjusted so that the hydrochloric acid concentration is from 0.1 to 1.0 M. Concentrations of greater than 1.0 M will adversely affect uranium distribution ratios since the extraction coefficient of uranium is inversely proportional to the second power hydrogen ion concentration. Hydrogen ion concentrations which are too low may result in difficulties in disengagement between the aqueous and organic phases, due to emulsification.

If the uranium values are a major component of the feed solution, it will be necessary to adjust the concentration of the uranium values contained therein to up to 0.25 M for reasons which will be explained hereinafter.

The organic extractant consists of up to 1.0 F bis(2,6-dimethyl-4-heptyl) phosphoric acid in a suitable diluent. Formality, F, is a concentration unit defined as the number of formula weights of solute contained in one liter of solution. For example, a 1.0 F solution of extractant contains, in one liter of solution, the number of grams of extractant indicated by the formula weight, disregarding any polymerization or dissociation that may take place. The extractant, bis(2,6-dimethyl-4-heptyl) phosphoric acid has the structural formula $$\{[(CH_3)_2CHCH_2]_2CHO\}_2PO(OH)$$

and is prepared and purified as described in the Journal of Inorganic Nuclear Chemistry 32, 1011 (1970). It is important that extractant be pure to prevent recovery of values other than uranium.

The total amount of organic extractant in the extractant solution is limited by solubility, in certain diluents, to no more than about 1.0 F. The total amount of extractant which must be present in the extractant is dependent upon the total amount of uranium values which are present in the feed solution, since, for every atom of uranium present in the feed solution to be extracted, 4 molecules of organic extractant are necessary. It is obvious that the ratio of volumes of aqueous feed solution and organic extractant solution is affected by this requirement. However, this requirement can be met by the formula: R×formality of extractant in the extractant solution must equal 4×formality of the uranium values in the feed solution where R=ratio of volume of organic to aqueous phases.

The diluent can be any liquid organic compound in which the extractant is soluble and which is a nonhydrogen bond forming compound in that it is neither a hydrogen bond donor nor acceptor. Specific examples of such diluents are: the alkyl hydrocarbons, alkyl halides, aryl hydrocarbons and aryl halides, such as benzene, n-heptane, octane, decane, toluene, xylene, kerosene and naphtha.

It may be necessary to scrub from the organic extractant solution any thorium values which may have been coextracted with the uranium. This may readily be accomplished by multiple contacts with an aqueous scrub solution of 0.1 to 1.0 M hydrochloric acid.

The uranium values can be readily back-extracted by contacting the organic extractant solution with an aqueous back-extractant solution containing 4–12 M hydrochloric acid, although preferably the solution should contain 6–9 M hydrochloric acid.

The following examples are given as illustrative of the process of the invention and are not to be taken as limiting the scope or extent of the invention.

EXAMPLE I

The distribution ratios (K) of a representative selection of lanthanide and actinide elements in two different diluents were determined radiometrically by using a nuclide of the element as follows: a 2-ml. portion of aqueous phase containing the nuclide and a 2-ml. portion of barren extractant were mixed by manually shaking for 3 minutes in a 5-ml. stoppered glass cylinder. The equilibrated phases were then centrifuged for 1 minute and the phases then separated and centrifuged again. The phases were assayed by evaporating a known aliquot on a platinum disc and determining the alpha counting rate or beta counting rate associated with the evaporated sample. The results are given in Table I below.

TABLE I

[Measured K values for selected $M^{3+}$ elements and for $UO_2^{2+}$, $Sc^{3+}$ and $Th^{4+}$ from 0.025 F HCl into 0.60 F HD(DIBM)P in n-heptane or benzene]

| $M^{n+}$ | K | |
| --- | --- | --- |
| | n-Heptane | Benzene |
| $Eu^{3+}$ | $2 \times 10^{-3}$ | $2 \times 10^{-4}$ |
| $Lu^{3+}$ | $3 \times 10^{-1}$ | $2 \times 10^{-2}$ |
| $Y^{3+}$ | $3 \times 10^{-2}$ | $2 \times 10^{-3}$ |
| $Am^{3+}$ | $7 \times 10^{-4}$ | $2 \times 10^{-4}$ |
| $UO_2^{2+}$ | $1 \times 10^{5}$ | $2 \times 10^{4}$ |
| $Sc^{3+}$ | $3 \times 10^{4}$ | $6 \times 10^{2}$ |
| $Th^{4+}$ | $4 \times 10$ | 3 |

EXAMPLE II

In order to confirm the mutual separation of uranium and thorium values, the following experiments were run. A 2-ml. portion of feed solution 0.25 F in hydrochloric acid and containing $^{230}Th$ and $^{233}U$ was contacted with a 2-ml. portion of an extracted solution of 0.60 F

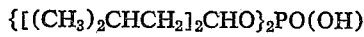

HD(DIBM)P in benzene for 3 minutes. The results of the experiments and the variation in conditions are given in Table II below. Analysis of the separated phases was accomplished as described in the previous example.

EXAMPLE III

A fuel sample containing 100 grams $Th^{232}$ and 1 gram $U^{233}$ as the metal or oxide is dissolved in concentrated hydrochloric acid. The hydrochloric acid solution containing the dissolved sample is diluted with water to 1 liter in volume and the hydrochloric acid concentration adjusted to 0.25 M to form a feed solution.

The feed solution is then contacted with an extractant solution of 0.6 F HD(DIBM)P in benzene or n-heptane,

TABLE II

[Mutual separation of $^{230}Th$ and $^{233}U$ in the system 0.60 F HD(DIBM)P in benzene vs. aqueous 0.25 F HCl]

| Expt. No. | Feed (aq.) | | U product (org.) | | Th product (aq.) | | D.F. for product— | |
| --- | --- | --- | --- | --- | --- | --- | --- | --- |
| | (c/m) | (U/Th)* | (c/m) | (U/Th)* | (c/m) | (Th/U)* | U | Th |
| 1 | $3.6 \times 10^6$ | 1.0 | $1.8 \times 10^6$ | $4.9 \times 10$ | $1.7 \times 10^6$ | $1.3 \times 10^3$ | $4.9 \times 10$ | $1.3 \times 10^2$ |
| 2 | $1.8 \times 10^6$ | $7.1 \times 10$ | | | $2.5 \times 10^4$ | $4.0 \times 10^3$ | | $2.8 \times 10^4$ |
| 3 | $2.0 \times 10^6$ | $1.2 \times 10^{-2}$ | $2.4 \times 10^4$ | 7.8 | | | $6.5 \times 10^2$ | |

*All ratios are expressed in terms of alpha counting rates.

NOTE.—Both organic and aqueous phases were used in 2-ml. portions. The aqueous feed (Th and U in 0.25 F HCl) was considered the first aqueous phase in a given experiment. Any succeeding aqueous phases were initially barren 0.25 F HCl. All organic phases were initially barren. Expt. 1. Phases: 1 aq., 1 org. U and Th, initial ratio unity, decontaminated mutually. Expt. 2. Phases: 1 aq., 3 org. The minor component, Th, decontaminated from U. Expt. 3. Phases: 4 aq., 1 org. The minor component, U, decontaminated from Th.

which extracts the uranium from the feed solution and also coextracts a small amount of the thorium. Next, contact the organic etxractant solution with three successive 500-ml. portions of an aqueous solution of 0.25 M hydrochloric acid as a scrub solution, thereby removing any thorium which has been coextracted.

Contact the scrubbed organic extractant solution with four successive 250-ml. portions of an aqueous 6 M hydrochloric acid solution as a back-extractant.

The combined portions of the back-extractant solution contain greater than 0.98 gram of $U^{233}$ and less than 0.001 gram of $Th^{232}$.

As can be seen from the foregoing description and examples, the method of this invention provides an effective means for the separation of uranium values from yttrium and the actinide and lanthanide rare earths and, more important, an effective means for the quantitative separation of uranium and thorium values.

It will be understood that the invention is not to be limited by the details given herein but that it may be modified within the scope of the appended claims.

The embodiments of the invention in which an exclusive property or privilege is claimed are defined as follows:

1. A method for separating uranium values from the actinides, lanthanides, yttrium and thorium values comprising:
    dissolving said values in hydrochloric acid to form a feed solution,
    adjusting the feed solution to from about 0.1 to 1.0 M in hydrochloric acid and to contain up to 0.25 F in uranium values,
    contacting said feed solution with an organic extractant of bis(2,6-dimethyl-4-heptyl) phosphoric acid in an organic diluent selected from the group consisting of benzene, toluene, n-heptane, carbon tetrachloride, kerosene and xylene, whereby the uranium values are taken up by the organic extractant and the other values remain in the feed solution, and
    separating the organic extractant from the feed solution.

2. The method of claim 1 wherein the uranium values are back-extracted from the organic extractant by contacting the organic extractant solution with an aqueous solution containing 4–12 M hydrochloric acid.

3. The method of claim 1 wherein the organic extractant contains up to 1.0 F of bis(2,6-dimethyl-4-heptyl) phosphoric acid.

4. The method of claim 2 wherein the aqueous back-extractant solution is from about 6 to 9 M in hydrochloric acid.

5. The method of claim 4 including the additional step of scrubbing the extractant solution containing the uranium values with 0.1 to 1.0 M hydrochloric acid to remove any thorium values which may have been coextracted with the uranium values.

6. A method of separating uranium values from thorium values comprising dissolving said values in a hydrochloric acid solution, adjusting the solution to from 0.1 to 1.0 M hydrochloric acid and to contain up to 0.25 F uranium values to form a feed solution, contacting the feed solution with an organic extractant solution of 0.6 F bis(2,6-dimethyl-4-heptyl) phosphoric acid in a diluent selected from the group consisting of benzene and n-heptane, thereby extracting the uranium values and some of the thorium values, contacting the extractant solution with a scrub solution of 0.1 to 1.0 M hydrochloric acid to scrub the thorium values from the extractant solution, and contacting the extractant solution wtih a 6–9 M solution of hydrochloric acid, thereby back-extracting the uranium values from the organic extractant solution.

References Cited

UNITED STATES PATENTS

| | | | |
|---|---|---|---|
| 2,958,573 | 11/1960 | Gustison et al. | 423—10 |
| 2,848,300 | 8/1958 | Warf | 423—10 |
| 2,859,094 | 11/1958 | Schmitt et al. | 423—10 |
| 3,214,239 | 10/1965 | Hazen et al. | 423—10 |
| 3,326,811 | 6/1967 | Healy | 423—10 |

CARL D. QUARFORTH, Primary Examiner

F. M. GITTES, Assistant Examiner

U.S. Cl. X.R.

423—252, 258; 23—312 ME